UNITED STATES PATENT OFFICE.

LEONARD BELLINGRATH, OF CASTLEBERRY, ALABAMA.

PROCESS OF MANUFACTURING ROSIN AND SPIRITS OF TURPENTINE.

SPECIFICATION forming part of Letters Patent No. 284,367, dated September 4, 1883.

Application filed April 10, 1882. (No specimens.)

*To all whom it may concern:*

Be it known that I, LEONARD BELLINGRATH, of Castleberry, in the county of Conecuh, and in the State of Alabama, have invented certain new and useful Improvements in the Manufacture of Rosin and Spirits of Turpentine; and I do hereby declare that the following is a full, clear, and exact description thereof.

This invention relates to an improved method of separating the volatile from the solid portions of turpentine; and it consists in providing a process whereby the crude turpentine may be cleansed, the volatile portions distilled and condensed, and the rosin separated therefrom in condition for use, as more fully hereinafter specified; and it has for its object, first, to use steam heat only; second, to provide for removing the turpentine during the process of distillation from the action of fires; third, to prevent all liability of scorching or burning the turpentine, whereby better spirits are produced.

In carrying out my invention I take the crude turpentine and melt it by steam heat (as distinguished from fire heat) in a suitable vessel or still, heating it to a temperature sufficient to volatilize the spirit, which is driven off and condensed in a suitable worm or condenser. When the spirit has been completely driven off by the action of the steam upon the turpentine, the melted rosin is passed through sieves into a suitable open vessel, where it is kept heated in a liquid state by steam heat until all the water and other impurities capable of vaporization have volatilized, after which it is run through strainers into a rosin vat or bin, from which it is transferred or poured into suitable vessels or packages for the market.

By my improved method of preparing turpentine the rosin is obtained in a perfectly pure state, without risk of discoloration from overheating or loss of the volatile spirits, which are collected in a largely-increased quantity and in a perfectly pure condition for use, the solid impurities being separated by the sieves.

The pure state of the rosin above referred to is due to the fact that it is not allowed to be brought into contact with any surface which receives its heat by the direct application of fire. By this means I have ascertained by practical experiment that my process gives a larger yield of spirits than that obtained by the processes in general use, and which fact I attribute, first, to my being able to run the material closer—that is, to raise the turpentine to the highest degree of heat necessary—without injury to the rosin; and, second, to the fact that by the sole use of steam the heat never becomes so high as to consume the vapors, or to cause destructive distillation. I am aware, however, that the use of steam heat in the distillation of turpentine is not broadly new; but in the instance to which I refer the crude turpentine was first subjected to the action of steam to a degree only sufficient to liquidize the same, so that it might go through two steps of straining, after the last of which it was conducted to the still for evaporization, the sides of the still being in direct contact with fire heat and the bottom provided with a steam-jacket. In that instance, also, the pipe by which the rosin was conveyed from the still was subjected to the action of the fire. If the steam bottom is used, it will be found that the fine heavy sediment which is in the material will settle to the bottom, and that it will be almost impossible to finish the rosin, as the sediment prevents the heat from penetrating, and if the rosin in being conveyed from the still is allowed to come in contact with pipes or vessels which are subjected to the action of fire the rosin will be found to be scorched, and thus be impaired in value and usefulness.

I am further aware that it is not new to subject crude turpentine to the action of steam heat alone, but in such instance there was no provision made by which the material after such action was conducted to an open vessel and there subjected to further steam heat until the water and all other impurities capable of vaporization were volatilized.

Having thus fully described my invention, what I claim, and desire to secure by Letters Patent, is—

The process herein described of manufacturing rosin and spirits of turpentine, consisting in, first, melting the crude turpentine by steam heat to a temperature sufficient to volatilize the spirit; second, in driving off the spirit; third, in condensing the same; fourth, in passing the rosin from the still through sieves into suitable vessels; and, fifth, in there keeping it heated and in a liquid state by steam heat until all the water and vaporizable impurities are dispelled, substantially as described.

In testimony whereof I affix my signature, in presence of two witnesses, this 16th day of March, 1882.

LEONARD BELLINGRATH.

Witnesses:
 ED GULLATT,
 L. A. REDWINE.